358-190. OR 3,601,533 SR

[11] 3,601,533

[72] Inventor Lester Tucker Matzek
Lombard, Ill.
[21] Appl. No. 648,028
[22] Filed June 22, 1967
[45] Patented Aug. 24, 1971
[73] Assignee Warwick Electronics Inc.

[54] REGULATED HIGH VOLTAGE SUPPLY
2 Claims, 4 Drawing Figs.

[52] U.S. Cl. 178/7.5 R, 178/DIG. 11, 178/5.4
[51] Int. Cl. H04n 3/18
[50] Field of Search 178/7.5, 7.5 E, 5.4, 5.4 PE, 6 PS, 69.5 CB

[56] References Cited
UNITED STATES PATENTS

| | | | |
|---|---|---|---|
| 2,435,414 | 2/1948 | Sziklai et al. | 178/6 (PS) |
| 2,956,125 | 10/1960 | Rausch | 178/69.5 (CB) |
| 3,098,170 | 7/1963 | Rhodes | 178/5.4 (PEN) |
| 3,109,891 | 11/1963 | Molzahn | 178/7.5 |
| 3,270,128 | 8/1966 | Stark, Jr. | 178/5.4 |
| 3,519,741 | 7/1970 | Knight | 178/7.5 |

*Primary Examiner*—Richard Murray
*Attorney*—Hofgren, Wegner, Allen, Stellman & McCord

ABSTRACT: A regulator circuit for a color television receiver in which a gate tube is connected in shunt with a portion of the horizontal output transformer from which high voltages are derived. The gate tube is normally nonconducting, but is pulsed into conduction during retrace, when the high voltage rectifiers conduct. The bias of the gate is varied in accordance with the current drawn by the cathode ray tube. The gate conducts more heavily when the current drain is low than when it is high, keeping the output of the high voltage power supplies relatively constant.

T5117

R

PATENTED AUG 24 1971

3,601,533

INVENTOR
LESTER TUCKER MATZEK
BY Hofgren Wegner, Allen Stellman & McCord
ATTORNEYS

REGULATED HIGH VOLTAGE SUPPLY

In a television receiver the high voltages which provide, among other things, the accelerating and focus potentials for the cathode-ray tube, are obtained from an auto transformer connected with the horizontal scanning circuit. A pulse which occurs during the retrace portion of the scanning cycle is stepped up to a high voltage by the auto transformer and is rectified, establishing high voltages for the display tube and for other circuits in the receiver. The impedance of the high voltage source is high and the voltage regulation is poor, the voltage level varying with the load, or current through the display tube, which in turn is a function of the white content of the picture being displayed. The variation in high voltage level is more troublesome in a color television receiver than in monochrome as it often results in defocusing and improper color registration. It is common in a color television receiver to utilize a high voltage shunt regulator circuit which requires an expensive regulator tube and components, designed to withstand the high voltage which may be of the order of 25,000 volts.

In accordance with the present invention, a variable impedance device is connected in shunt with a portion of the source of pulses from which the high voltage is derived. The impedance of the device is varied in accordance with the current drain on the high voltage source so that the output voltage is maintained at a relatively constant level. More particularly, the device or gate tube is cut off during the scan portion of the deflection cycle and conducts during retrace, when the pulse is formed from which the high voltages are derived. The level of conduction is dependent on the load in the high voltage system.

Another feature of the invention is that the load device includes a tube with plural control grids and with a cathode-anode circuit connected in shunt with the source of pulses. Cutoff and load responsive bias voltages are applied to the control grids. A pulse is applied to one of the control grids to render the tube conductive during retrace.

Further features and advantages of the invention will readily be apparent from the following specification and from the drawings, in which.

Figures 1, 2, 3, 4:
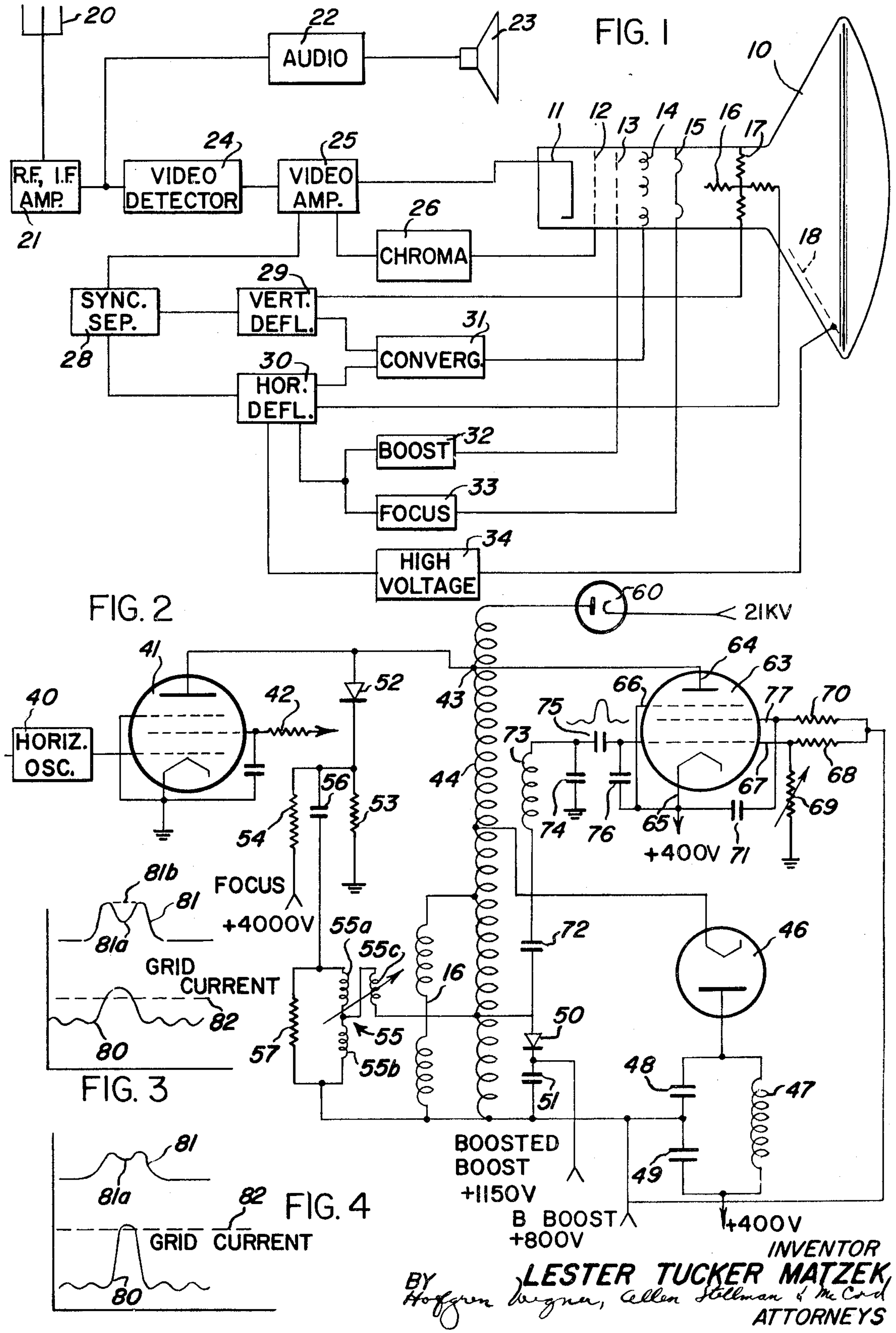
FIG. 1 is a block diagram of a color television receiver illustrating the environment of the invention.
FIG. 2 is a schematic diagram of a portion of the high voltage circuit of a color television receiver, embodying the invention.
FIG. 3 illustrates the horizontal amplifier plate voltage and the regulator grid voltage for a condition of no-load.
FIG. 4 illustrates the horizontal amplifier plate voltage and the regulator grid voltage for a condition of full load.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

The invention is illustrated herein as embodied in a color television receiver circuit and as utilizing a vacuum tube regulator in conjunction with other vacuum tube components. Should high voltage variations with load prove a problem in black and white television receivers, the regulator could be used therein. Similarly, it could be used in other circuits having a high voltage derived from a pulse source and subject to voltage variation as a function of load requirements. Many aspects of the invention are applicable to a circuit utilizing solid state components rather than vacuum tubes. During the course of the following description, specific values and component types will be assigned the various circuit elements. This specific disclosure is made for the purpose of illustrating an operative embodiment of the invention. Many changes and modifications will be apparent to those skilled in the art and it is not intended that the specific types and values be considered critical, unless so stated.

Referring now to FIG. 1, the color television receiving system incorporates a tricolor cathode-ray tube 10 which has a cathode 11, three control grids 12, three screen grids 13, a convergence coil system 14, and a focus electrode 15. Horizontal and vertical deflection coils are indicated at 16 and 17, respectively. The beam accelerating electrode or coating inside the tube is indicated by broken line 18. The tricolor display device is part of a receiving system which includes an antenna 20 connected with radio and intermediate frequency amplifiers illustrated in block form at 21. From the output of the intermediate frequency amplifier, an audio system 22 delivers an audio signal to speaker 23. A video detector 24 is connected between amplifiers 21 and video amplifier 25 which has an output providing a monochrome signal to the cathode 11 of the display device. Another output of video amplifier 25 is connected with the chroma detector and amplifier system 26 and to the display device control grids 12. A third output of video amplifier 25 is connected with the synchronizing signal separator 28 which provides synchronizing information to the vertical deflection system 29 and the horizontal deflection system 30. The deflection signals are connected from the respective systems to horizontal and vertical deflection coils 16 and 17. Signals from both deflection systems are combined in the convergence network 31 and connected with convergence coils 14.

Various voltages are derived from horizontal deflection system including a boost voltage at 32, connected with the screen grids of the display device, a focus voltage at 33, connected with the focus electrode 15 and a high voltage at 34, connected with the accelerating element 18 of the display device.

Turning now to FIG. 2, the regulator circuit of the invention will be described in detail. With the exception of the regulator circuit, the horizontal deflection system and other portions of the high voltage power supply are known. The circuit and so much of the operation as is necessary to an understanding of the regulator circuit will be described. However, a thorough technical discussion of the deflection and high voltage circuit will not be given.

Horizontal oscillator 40 generates a signal at the horizontal scanning frequency, in synchronism with the horizontal synchronizing information from separator 28. The output of the oscillator is connected with control grid of horizontal amplifier 41, a 6JE6. The cathode of the amplifier is returned to ground and the screen grid is connected through a resistor 42, 13,000 ohms, with a source of voltage of the order of 400 volts. The anode of horizontal amplifier 41 is connected with a tap 43 an autotransformer winding 44. The horizontal deflection coils 16 are connected in shunt with a portion of winding 44.

A diode damper 46, 6DW4, has its cathode connected with a tap of autotransformer winding 44 and its anode connected through horizontal efficiency coil 47 with a source of operating potential, as 400 volts, not shown. Connected in shunt with efficiency winding 47 are a pair of capacitors 48, 0.068 $\mu$f., and 49, 0.082 $\mu$f. The junction between the two series connected capacitors is connected with the lower end of autotransformer winding 44 and deflection coils 16. The damper conducts during retrace preventing the establishment of oscillatory currents in the deflection coil and autotransformer, and charging capacitors 48 and 49 to a level of approximately 400 volts, which adds to the operating potential of 400 volts, providing a boosted B+ of about 800 volts. The boosted B+ operating potential is utilized in the scan circuitry, and its level affects both linearity and scan size.

A diode rectifier 50 is connected in series with a capacitor 51, 0.01 $\mu$f., in shunt with a portion of winding 44, adjacent the lower end thereof. Retrace pulses appearing at the diode 50 are rectified and filtered by capacitor 51, providing a boosted-boost potential of the order of 1150 volts which is utilized to energize the screen grid elements 13 of the display device. The stability of the voltage at these elements affects color purity.

A focus potential is also derived from the horizontal output circuitry. Focus rectifier diode 52 is connected with the anode of horizontal power amplifier 41 and through a resistor 53, 66 megohms, with ground. A voltage of the order of 4000 volts is derived from the rectifier and applied to the focus element of the display device through a resistor 54, 4.7 megohms. An adjustment of the focus potential is provided by a differential transformer circuit 55 which includes a pair of windings 55*a* and 55*b* connected in series, and in series with DC blocking capacitor 56, 130 pf., between the junction of rectifier 52 and resistor 53, and the B boost terminal. A resistor 57, 100,000 ohms, shunts windings 55*a* and 55*b*. A differential coupling winding 55*c* is connected between the midpoint of windings 55*a*, 55*b*, and a tap of autotransformer winding 54. Adjustment of differential transformer 55 couples the voltage appearing at the autotransformer tap, in different proportions, to the two windings 55*a* and 55*b*, providing a range of control of the focus potential above and below the nominal value.

High voltage rectifier diode 60 has its anode connected with the upper end of the horizontal autotransformer 44 and its cathode connected with the accelerator element 18 of the display device. A no-load voltage of the order of 24,000 volts is developed at the cathode. As the light content of the picture displayed varies, there is a corresponding variation in the current flowing in the tube and drawn from rectifier 60. When the picture is light, tube current is high while with a dark picture the tube current is low. The high voltage power supply has a relatively high impedance so that variations in current delivered to the display device have a substantial effect on the output voltage of rectifier 60. In addition, the load variation results in instability of the focus, boosted boost and the B boost potentials. These potential changes cause variation in scan size, linearity, focus and color resolution.

It has been common in the past to connect a shunt regulator circuit from the cathode of the high voltage rectifier to ground. This has the effect of stabilizing the current drawn from the high voltage supply, at a high level, preventing changes in the voltages. Although such regulators can operate satisfactorily, they require expensive circuit components because of the high voltages involved and dissipate substantial power.

In accordance with the present invention, a regulator or gate tube 63, 6DQ5, has its anode 64 connected with the anode of horizontal output amplifier 41 and its cathode returned to the 400 volt power supply effectively in shunt with a portion of the autotransformer winding 44. The regulator tube is a pentode having control, screen and suppressor grids. Control grid 67 is connected with the junction of a voltage divider including resistor 68, 1.8 megohms, and potentiometer 69, 1 megohm, between the 800 volt B boost source and ground. Thus, a voltage substantially less than the 400 volt cathode potential is applied to the control grid, maintaining the regulator in a cutoff condition. The screen grid is connected through a current limiting resistor 70, bypassed by capacitor 71, with the B boost source. The suppressor grid is connected with the cathode 65.

Control grid 67 is also connected with a source of pulses of sufficient amplitude to render it conductive during retrace. More specifically, the tap of autotransformer winding 44 from which the boosted boost and focus adjustment potentials are obtained is connected through a coupling capacitor 72, 0.1 $\mu$f., with the control grid. Series inductor 73, 5.6 $\mu$h., and shunt capacitor 74, 500 pf., form a phase shift network for the third harmonic of the retrace pulse (approximately 100 kilocycles) which shifts the third harmonic approximately 180° so that the peak of the fundamental is accentuated, narrowing the pulse. Series capacitor 75, 33 pf., and shunt capacitor 76, 290 pf., form a voltage divider which establishes the desired pulse operating potential at the control grid.

The cathode of voltage regulator 63 is returned to the 400 volt supply which has a relatively stable output regardless of the power requirements of the receiver. Control grid 67 and screen grid 77 are connected with the B boost terminal, the potential at which varies with the current drawn from diode 60 by the display device. The positive pulse applied to the control grid during retrace is sufficient to overcome the negative cutoff bias applied to the control grid by the voltage divider, 68, 69, rendering the regulator conductive during retrace. This causes a diminution of the retrace pulse amplitude to high voltage rectifier 60, and to the focus and boosted boost rectifiers 52 and 50. The level of current flow through the regulator tube 63, and thus the degree of diminution of the flyback pulse, depend on the bias level established by the B boost voltage, applied to the control and screen grids of the regulator tube.

This is illustrated in FIGS. 3 and 4 where the regulator control grid voltage is plotted at 80 and the horizontal amplifier plate voltage at 81. The level at which grid current is drawn in the regulator tube is indicated by broken line 82. In FIG. 3, under no-load conditions, the regulator tube is quickly driven into the grid current region and there is a substantial reduction of the horizontal amplifier plate voltage at 81*a*. The broken line 81*b* indicates the form of the retrace pulse at the plate of the horizontal amplifier tube in the absence of regulator 63. FIG. 4 illustrates the full-load condition with the grid voltage 80 barely reaching the grid current level and only a slight reduction in the amplifier plate voltage at 81*a*.

The effect of drawing current through the gated regulator tube 63 is to reduce the energy available to rectifiers 50, 52 and 60 and to the boost supply connected with damper 46. The amount of current drawn by the regulator tube varies inversely with the load on the high voltage supply, stabilizing the level of all the voltages.

I claim:

1. In a television receiver including a high voltage cathode-ray tube display device, deflection windings for said cathode-ray tube and a source of deflection waves for energizing said deflection windings, an improved regulated high voltage supply comprising,

- a transformer, responsive to said deflection waves for developing flyback pulses during the retrace interval of said deflection waves,
- rectifier means connected between said transformer and said cathode-ray tube for rectifying said flyback pulses and producing a high voltage for said cathode-ray tube,
- a normally nonconductive variable conduction device connected in shunt with at least a portion of said transformer,
- means for coupling a potential indicative of the current drawn by said cathode-ray tube to said variable conduction device,
- and means connected between said transformer and said variable conduction device for coupling a keying pulse, time coincident with said flyback pulse to said variable conduction device to cause conduction in said variable conduction device at a level proportional to said potential to thereby vary the load on said transformer during the flyback interval and regulate the amplitude of the flyback pulses to maintain a constant high voltage for said cathode-ray tube, said last mentioned means including reactive circuit means for shifting the third harmonic of said keying pulse into additive relation with the fundamental.

2. The apparatus of claim 1 wherein said variable conduction device comprises a vacuum tube having at least an anode, cathode and control grid, the anode cathode circuit of said vacuum tube being connected in shunt with at least a portion of said transformer, said vacuum tube being normally biased beyond cutoff and further wherein said cathode-ray tube load indicative potential and said keying pulse are coupled to said control grid.